UNITED STATES PATENT OFFICE.

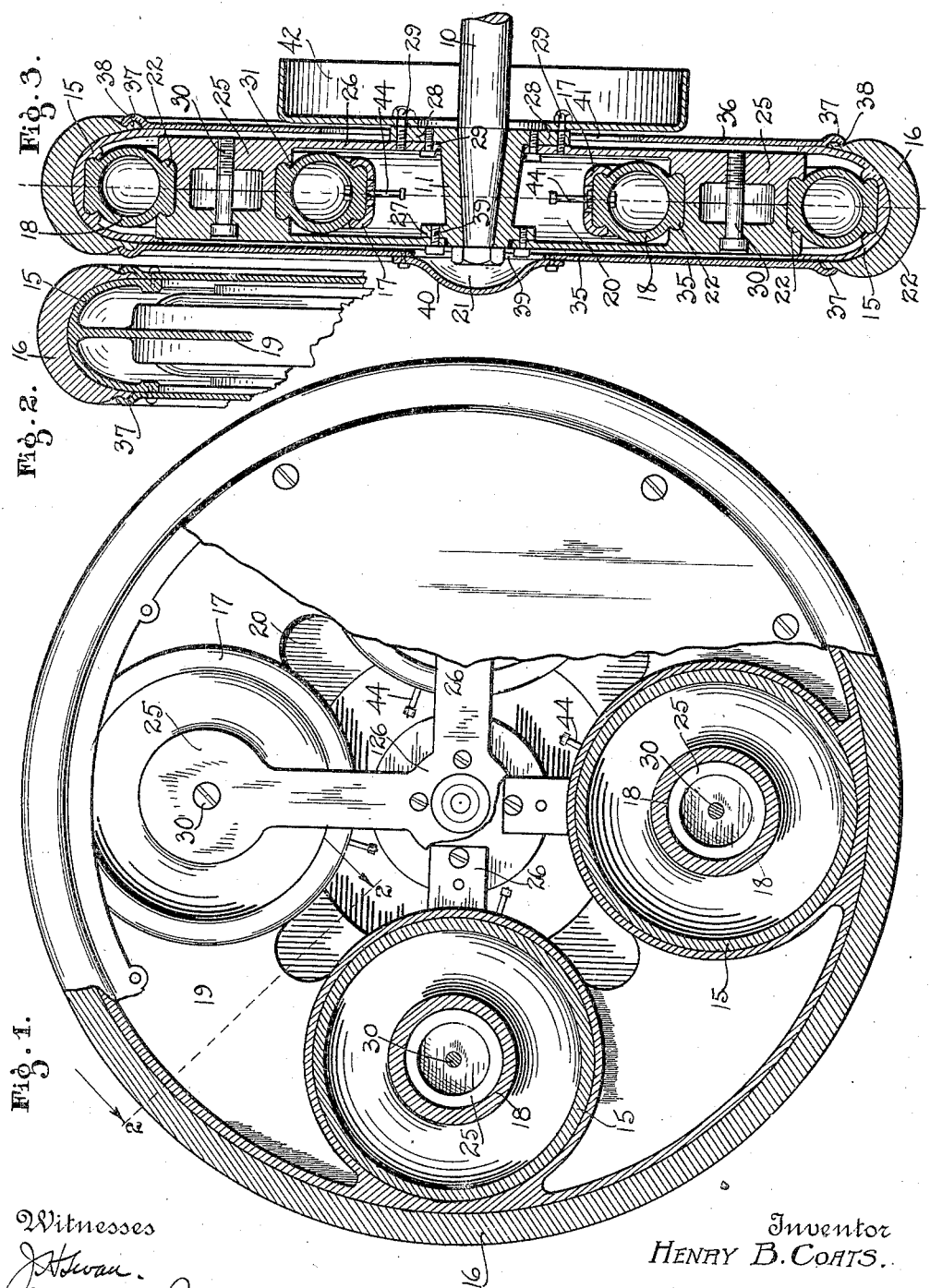

HENRY B. COATS, OF VEEDERSBURG, INDIANA.

VEHICLE-WHEEL.

1,180,012.   Specification of Letters Patent.   Patented Apr. 18, 1916.

Application filed November 30, 1912. Serial No. 734,285.

*To all whom it may concern:*

Be it known that I, HENRY B. COATS, a citizen of the United States, and a resident of Veedersburg, county of Fountain, and State of Indiana, have invented a certain new and useful Vehicle-Wheel; and I do hereby declare that the following is a full, clear, and exact description thereof, reference being had to the accompanying drawings, in which like letters refer to like parts.

The object of this invention is to provide an improved vehicle wheel having a solid rubber tire or non-puncturable tire of any kind, and a chambered frame with means secured to and carried by said frame for mounting and holding the external peripheries of a plurality of annular pneumatic cushions, and means secured to a floating hub in the wheel which each cushion surrounds and on which its internal periphery is secured. In the foregoing construction the pneumatic cushions are, therefore, embedded in a tire rim and close to the tread portion of the wheel so as to greatly further the resistance of the parts of the wheel to lateral thrust. Furthermore, the load is received and carried by the inner peripheries of the series of annular cushions, being suspended therein, so that all of said cushions will coöperate in absorbing the shock or vibrations of the wheel and a very strong, durable and convenient construction results therefrom.

Solid rubber tired wheels heretofore have not been satisfactory in automobiles while turning corners or where there is any skidding or lateral movement or thrust. At least, solid rubber tired wheels have not, in such situations, operated as satisfactorily as pneumatic tired wheels.

This invention provides a solid rubber tired wheel with annular pneumatic cushions so arranged in the tire rim of the wheel as to cause these wheels to operate as satisfactorily as pneumatic tired wheels in such situations above mentioned, and this result is attained while retaining the advantages of the solid rubber tired wheel and having the advantages of the pneumatic wheel.

The nature of the invention will be understood from the accompanying drawings and the following description and claims.

In the drawings, Figure 1 is a side elevation of the wheel with parts broken away to disclose the interior thereof. Fig. 2 is a section on the line 2—2 of Fig. 1. Fig. 3 is a horizontal section centrally through the wheel, the axle being partially broken away.

There is shown in the drawings herein an axle 10 secured in the hub 11 by a nut 12. The hub 11 floats in the wheel, as hereafter will be explained, and it is immaterial to this invention whether the axle is secured to the hub, as is necessary to make a driving wheel, or is loose in the hub, as would be the case with the front wheels or other wheels to which power is not transmitted.

The wheel has an annular peripheral tire rim 15 upon which there is shown a solid rubber tire 16, although no rubber tire is necessary if it be not desired. Integral with said tire rim 15 there is provided a plurality of annular clenching members 17 for engaging and holding the external peripheries of annular pneumatic cushions 18.

The tire rim 15 is tangential of the clenching members 17 and in fact, the tire rim constitutes the outer portion of the clenching member, as seen in Figs. 1 and 3, so that the pneumatic cushion is embedded in the tire rim and sets down close to the tread of the wheel and thus the wheel is greatly strengthened to enable it to receive lateral thrust. Between the annular clenching member 17 and the tire rim 15 and intergral therewith there are web plates 19, see Figs. 2 and 3, so that the parts 15, 17 and 19 constitute one solid and integral structure with a large central opening at 20 surrounding the hub, said opening having an irregular contour, as seen in Fig. 2, although this latter is immaterial so long as there is ample opportunity for the hub to float.

The pneumatic cushions have beads 22 on each side of the external peripheries thereof and also on each side of the internal peripheries thereof. Then said cushions surround and are held in place by a central holding means consisting of two cylindrical inward extensions 25 on the outer ends of radial bars 26 which are secured to the radial arms or flanges 27 and 28 on the hub by bolts 29. The extensions 25 for each cushion are similarly formed, but oppositely projecting, so that each one projects about half way through the annular cushion and they are secured together by a bolt 30 so as to make a support for the cushion to surround. Each internal cushion supporting extension 25 has an annular flange or rib 31 adapted to embrace the internal bead 22 on the cushion, whereby the cushion is firmly held in place.

It is, therefore, apparent that the four cushions shown are firmly mounted close to the tread of the wheel and with the hub and also the means extending from the hub through the cushions floating so that any load coming on the axle or any vibration of the wheel by reason of the roughness of the roadway, will tend to collapse the lower part of each cushion and stretch the upper part of each cushion. In other words, the load is carried in the cushions and the cushions are secured to the tire rim or wheel.

The frame of the wheel is completed by the side plates 35 and 36 which are secured at their outer edges by bolts to the lateral portions of a tire rim which is U-shaped in cross section. At their outer margins, said plates have flanges 37 for overlapping beads 38 on the rubber tire 16, whereby said tire is held in such manner that the rubber tire protects the flanges 37 from contact with the street or roadway. The plate 35 has a central opening at 39 which is closed by a removable cap 40 and through which the axle of the hub and associated parts are accessible. Likewise, the plate 36 has an enlarged central opening 41 to permit play of the hub and flange 28 thereon. A brake drum 42 is secured to the flange 28 of the hub.

To place or replace a pneumatic cushion 18, the plate 35 is removed and then the outer bar 26 is loosened from the hub by the bolt 29 and its extension 25 loosened from the other extension by the bolt 30 and the outer bar 26 and extension 25 are removed and the annular cushion put in place in a deflated condition and the tube 44 which is connected with the cushion for inflating and deflating the same, is projected through an opening 45 in the portion of the clenching member 17 which lies near the hub. Then the parts 25, 26, 29 and 30 are replaced and the tire is inflated by applying a tube from an air pump or the like to the tube 44. Said tube 44, as seen in Fig. 2, lies to one side of and behind the bar 26. Then the plate 35 is secured in place. If a cushion needs inflation only, that can be accomplished by removing the cap 40 and thus rendering the tube 44 accessible. The outer bars 26 may be all secured together, as shown in Fig. 2, by a connecting plate 126 at their juncture, said plate being secured to the flange 27 of the hub and the inner plates 26 may be secured by the screws 29 directly to the flange 28. It is immaterial, however, how these bars 26 are secured to the hub for supporting the cushions. It is thus seen that in this vehicle wheel, the load is supported in the following manner by the internal peripheries of annular pneumatic cushions, the hub being secured to means which extends through and are supported in the internal peripheries of said cushions. Said cushions are mounted in external clenching rims secured to and forming a part of the wheel rim so as to be held stationary therein. Also the construction is such that annular cushions of large diameters may be employed so as to have great cushion capacity. Furthermore, the cushions are embedded partially in the tire rim on which there is mounted a solid rubber tire, so that there are the combined advantages of a pneumatic tired wheel and a solid rubber tired wheel and the wheel will resist the side thrust and operate as successfully in turning or skidding as a pneumatic tired wheel, although the tire thereof is solid rubber and, therefore, is strong and durable and non-puncturable.

I claim as my invention:

1. A vehicle wheel including a tire rim curved in cross section, a hub floating centrally thereof, a plurality of annular pneumatic cushions with their diameter less than the radius of the wheel, annular means for holding the external periphery of each cushion, which means is secured within and to said tire so that the outer portion of the cushion is embedded in the tire rim and transversely curved substantially concentric with the transverse curvature of the rim, and means extending from the hub and supported in the external periphery of each cushion.

2. A vehicle wheel including a tire rim curved in cross section, a hub floating centrally thereof, a plurality of annular pneumatic cushions with their diameter less than the radius of the wheel, annular means for holding the external periphery of each cushion, which means is secured within and to said tire so that the outer portion of the cushion is embedded in the tire rim and transversely curved substantially concentric with the transverse curvature of the rim, means extending from the hub and supported in the external periphery of each cushion, and side plates secured to said rim and extending inward beyond said cushions, substantially as set forth.

In witness whereof I have hereunto affixed my signature in the presence of the witnesses herein named.

HENRY B. COATS.

Witnesses:
J. H. WELLS,
ORPHA M. McLAUGHLIN.